(12) United States Patent
Auberg et al.

(10) Patent No.: US 11,875,310 B2
(45) Date of Patent: Jan. 16, 2024

(54) SPRAY RIG MONITORING SYSTEM

(71) Applicants: Aaron Auberg, Pella, IA (US);
Matthew R. Hugg, Pella, IA (US)

(72) Inventors: Aaron Auberg, Pella, IA (US);
Matthew R. Hugg, Pella, IA (US)

( * ) Notice: Subject to any disclaimer, the term of this patent is extended or adjusted under 35 U.S.C. 154(b) by 0 days.

(21) Appl. No.: 17/169,347

(22) Filed: Feb. 5, 2021

(65) Prior Publication Data

US 2021/0158294 A1 May 27, 2021

Related U.S. Application Data

(63) Continuation-in-part of application No. 16/909,561, filed on Jun. 23, 2020, now abandoned, which is a continuation-in-part of application No. 16/458,658, filed on Jul. 1, 2019, which is a continuation-in-part of application No. 15/593,901, filed on May 12, 2017, now Pat. No. 10,691,084.

(60) Provisional application No. 62/986,078, filed on Mar. 6, 2020, provisional application No. 62/971,599, filed on Feb. 7, 2020.

(51) Int. Cl.
| | | |
|---|---|---|
| *B05B 12/00* | (2018.01) | |
| *G06Q 10/10* | (2023.01) | |
| *B05B 12/14* | (2006.01) | |
| *G06Q 10/0631* | (2023.01) | |
| *G05B 15/02* | (2006.01) | |
| *E04G 21/14* | (2006.01) | |
| *G06Q 10/0639* | (2023.01) | |
| *E04B 1/76* | (2006.01) | |
| *G06Q 10/20* | (2023.01) | |

(52) U.S. Cl.
CPC ......... *G06Q 10/103* (2013.01); *B05B 12/004* (2013.01); *B05B 12/1418* (2013.01); *E04G 21/14* (2013.01); *G05B 15/02* (2013.01); *G06Q 10/0639* (2013.01); *G06Q 10/06313* (2013.01); *E04B 1/7604* (2013.01); *G06Q 10/06311* (2013.01); *G06Q 10/20* (2013.01)

(58) Field of Classification Search
CPC ........... G06Q 10/103; G06Q 10/06313; G06Q 10/0639; G06Q 10/06311; G06Q 10/20; B05B 12/004; B05B 12/1418; B05B 15/40; B05B 7/0408; E04G 21/14; G05B 15/02; E04B 1/7604; G01K 13/02; G01K 13/026
See application file for complete search history.

(56) References Cited

U.S. PATENT DOCUMENTS

| | | | |
|---|---|---|---|
| 8,561,921 B1 * | 10/2013 | Showman | B05B 7/2497 239/304 |
| 2015/0238986 A1 * | 8/2015 | Hasselschwert | B05B 5/0532 239/3 |
| 2018/0086317 A1 * | 3/2018 | Shank | B08B 3/02 |
| 2020/0050223 A1 * | 2/2020 | Lange | B05B 12/004 |
| 2020/0230632 A1 * | 7/2020 | Kieffer | B05B 12/12 |
| 2021/0131793 A1 * | 5/2021 | Dorneanu | G01B 11/24 |

* cited by examiner

*Primary Examiner* — Xin Y Zhong
(74) *Attorney, Agent, or Firm* — ZarleyConley PLC (57) ABSTRACT

A spray rig monitoring system having a plurality of sensors that detect and transmit operational parameters to a computer. The operational parameters are processed to determine if a spray rig and its crew are operating within preset parameters.

15 Claims, 8 Drawing Sheets

SPRAY RIG MONITORING SYSTEM

CROSS REFERENCE TO RELATED APPLICATION

This application is a Continuation-In-Part of pending U.S. Ser. No. 16/909,561 filed Jun. 23, 2020, which is a Continuation-In-Part of pending U.S. Ser. No. 16/458,658 filed Jul. 1, 2019, which is a Continuation-In-Part of issued U.S. Pat. No. 10,691,084 issued Jun. 23, 2020, and also claims priority to U.S. Provisional Application Ser. No. 62/971,599 filed Feb. 7, 2020, and U.S. Provisional Application Ser. No. 62/986,078 filed Mar. 6, 2020, the contents of these applications are hereby incorporated by reference in their entirety.

BACKGROUND OF THE INVENTION

This invention is directed to a spray rig monitoring system and more particularly a spray rig monitoring system where monitoring and analysis occur in real time.

Spray rigs are well known in the art for spraying foam or a coating on a surface. Typically spray rigs are manually operated where a pair of spray components are mixed and sprayed on a surface so that a chemical reaction between the spray components occurs that results in a final product.

To produce a final product that meets required specification spray rig performance is critical. The primary obstacles to proper installation of the final product are the ratio between the spray components, the pressure of the spray components, and the temperature of the spray components.

When a final product is installed off ratio where there is an excess of one of the spray components, or if the product is sprayed at incorrect temperatures or pressures, whether too high or too low, the resulting final product likely will not cure properly and the desired characteristics of the final product will likely not be achieved. It may also have a strong lingering odor as the raw chemicals leach or off-gas out of the product and can build up excessive heat that can cause charring or sometimes fire. It may also have cell structure that is too large or too small, or a density that is too high or too low. As a result, the final product will likely not achieve the correct R-value (insulating value), vapor permanence, tensile or compressive strength and the like. The final product also could experience charring, shrinking, poor yield, and poor dimensional stability. Worse, it may cause fire, or leach or off-gas hazardous vapors into the immediate surrounding area harmful to humans.

Presently, determining a proper ratio of spray components in the field is difficult to figure. To do so, operators attempt to extrapolate volumetric ratio by measuring pressure of individual components within the system while taking into account the viscosity of the individual components. The failsafe process for operators to confirm the production of an acceptable final product is to measure the density of the final product. If the final product does not meet required specifications, the final product must be torn out and re-sprayed. This process can only be performed on a small sample percentage of the total finished product for any given project and cannot reliably provide confirmation of acceptable product throughout the entire production process. Accordingly there exists a need in the art for a monitoring system that addresses these deficiencies.

As such, an objective of the present invention is to provide a spray rig monitoring system that more accurately monitors spray component ratio, temperature, pressure, ambient temperature, RH %, and barometric pressure.

Another objective of the present invention is to provide a spray rig monitoring system that monitors operational parameters of a spray rig in real time.

A still further objective of the present invention is to provide a spray rig monitoring system that provides notification to an operator when operational parameters exceed preset thresholds.

These and other objectives will be apparent to those skilled in the art based upon the following written description, drawings, and claims.

SUMMARY OF THE INVENTION

A spray rig monitoring system includes a spray rig that pumps, proportions, heats, mixes and sprays multiple, individual raw chemical components in order to produce a unique finished product whether a foam or a coating.

Connected to and in communication with the proportioner is a spray gun that mixes the first and second (and potentially additional) spray components and sprays the mixture under pressure onto a surface. Connected throughout the rig assembly are a plurality of sensors that detect a plurality of operational parameters of the spray rig assembly. The sensors are also connected to and transmit detected data to a central computer mounted on the rig assembly. In addition to processing and storing the detected data, the central computer transmits the data to a cloud based storage.

A home or base computer is able to access a cloud based website and the data stored in the cloud based storage. Data can be exported to the home computer via downloadable data (excel) file for further analysis/manipulation. The basic analysis/storage/processing of the data is done on the cloud server and is only viewed (browsed) via website by the home computer. In addition, the home computer, through a dashboard on the website, is able to access and analyze operational parameters in real time. The operational parameters are related to, but are not limited to, the equipment on the spray rig assembly. The location and travel routes of the spray rig assembly, the security of the spray rig assembly, operational parameters for a specific project, sales and estimating parameters, crew performance and goals, safety parameters, equipment maintenance and the like.

In addition, the central computer and/or the home computer compare detected data with preset operational thresholds input into the computer(s) by an operator. When a detected parameter exceeds a preset threshold a notification is sent to the operator.

DETAILED DESCRIPTION OF THE PREFERRED EMBODIMENT

Figure 1:
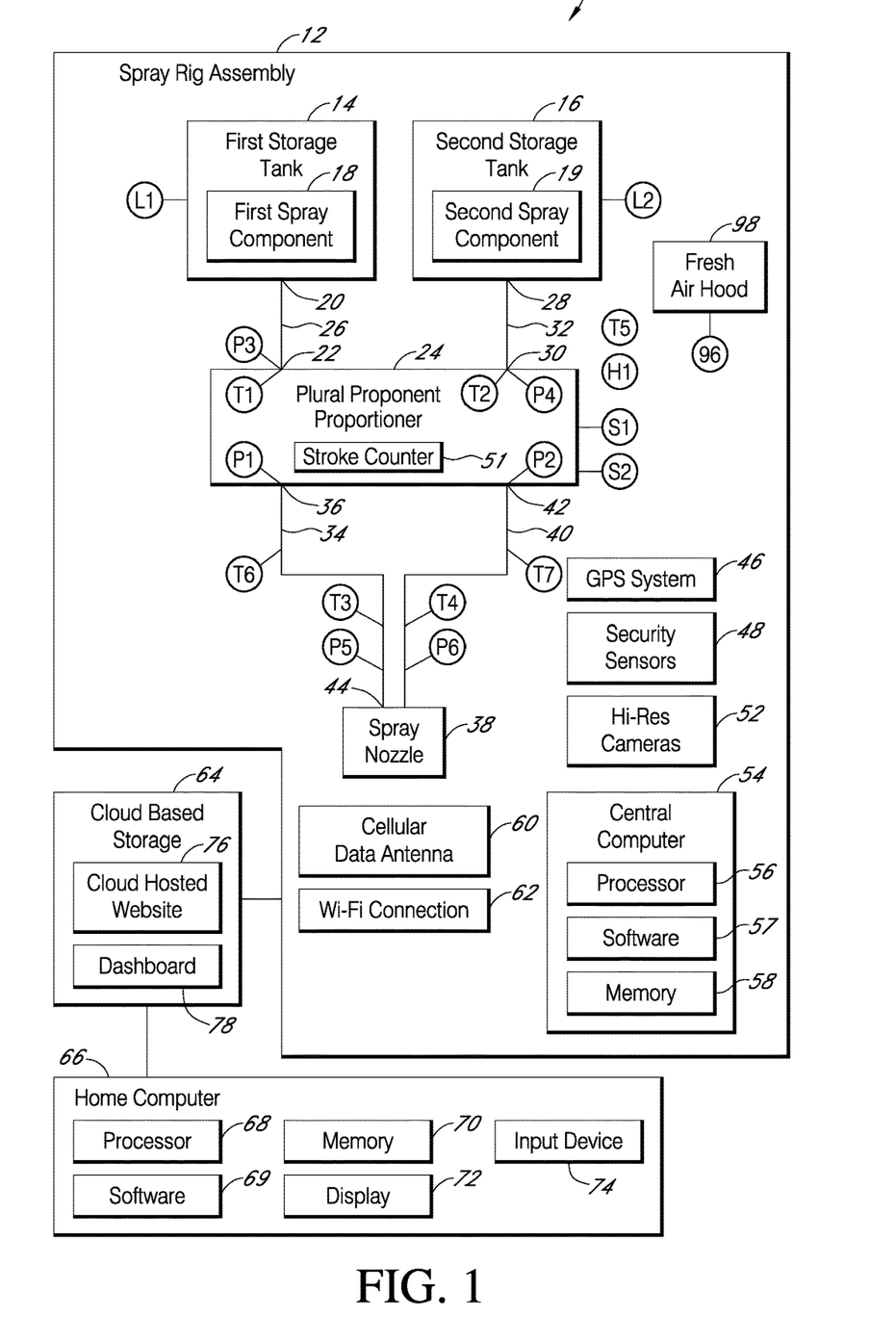
FIG. 1 is a schematic view of an environment for rig monitoring system.
Figure 2:
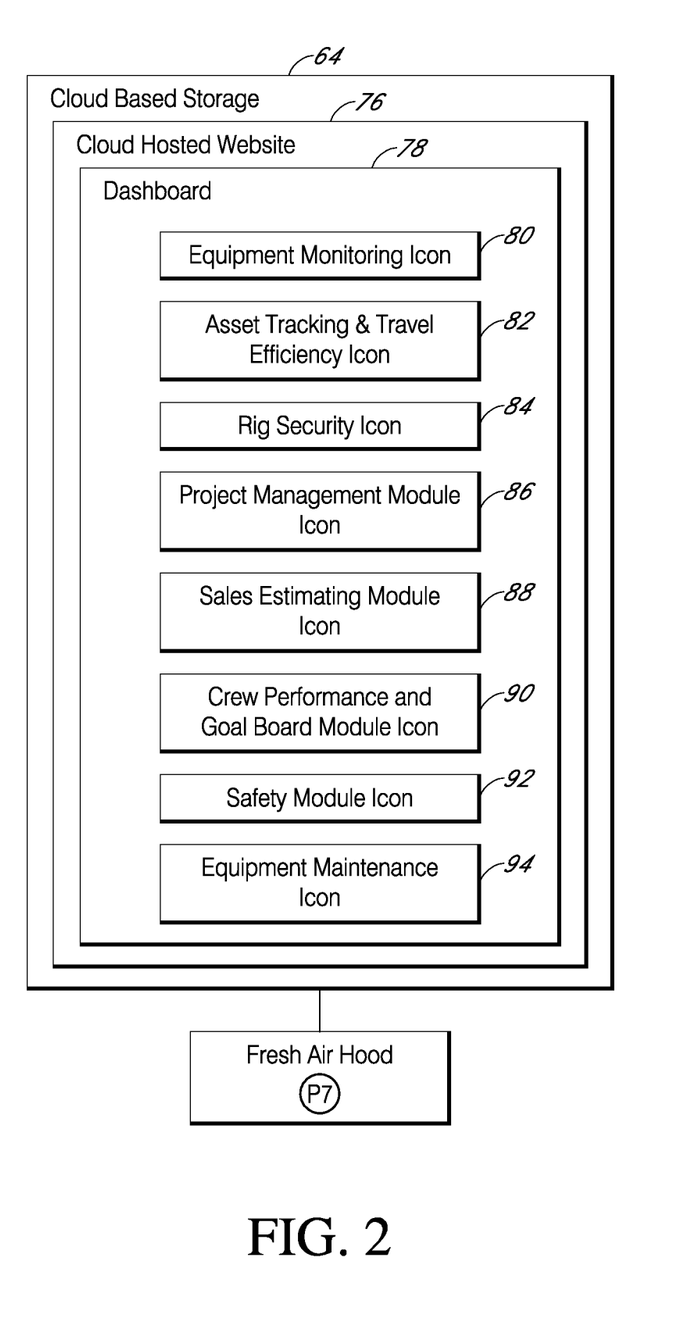
FIG. 2 is a schematic view of a portion of an environment of a spray rig monitoring system.
Figure 3:
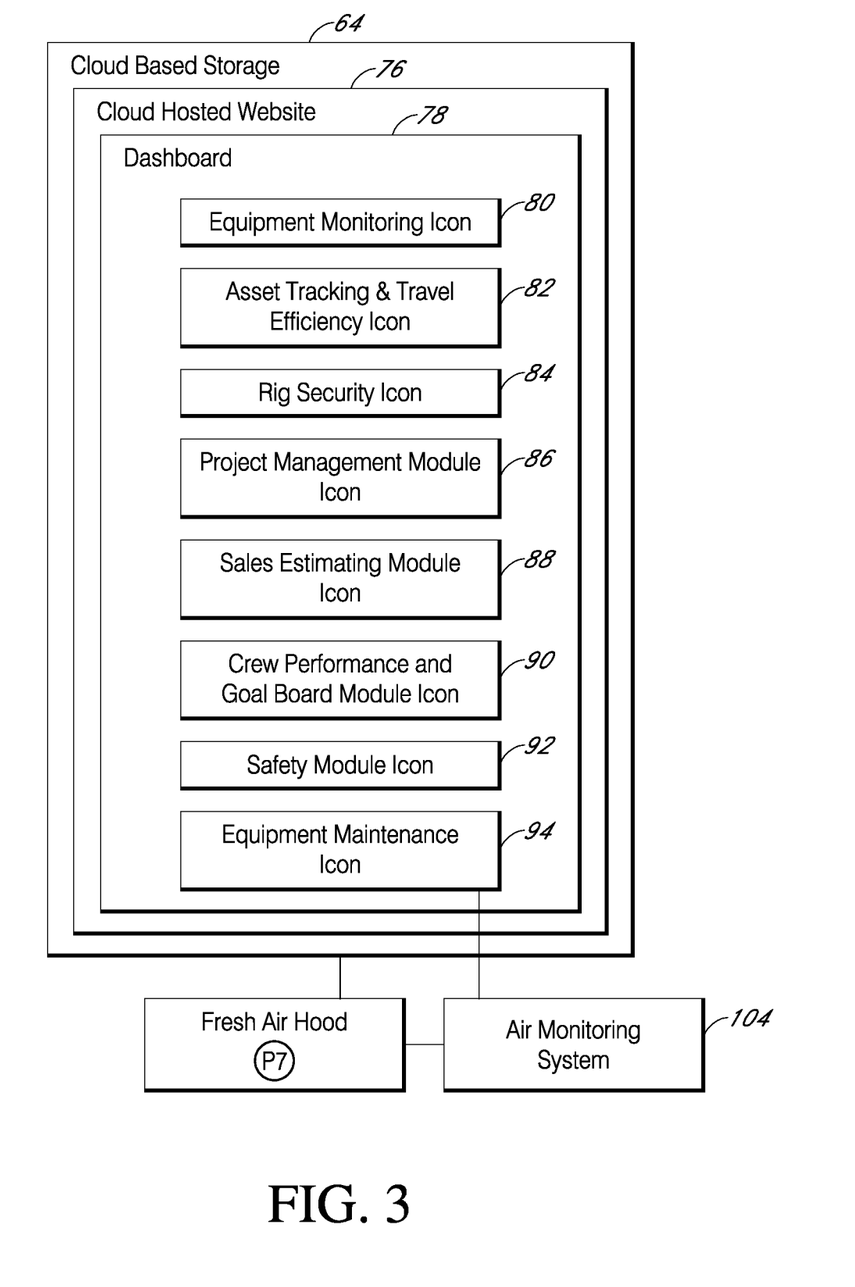
FIG. 3 is a schematic view of a portion of an environment of a spray rig monitoring system.
Figure 4:
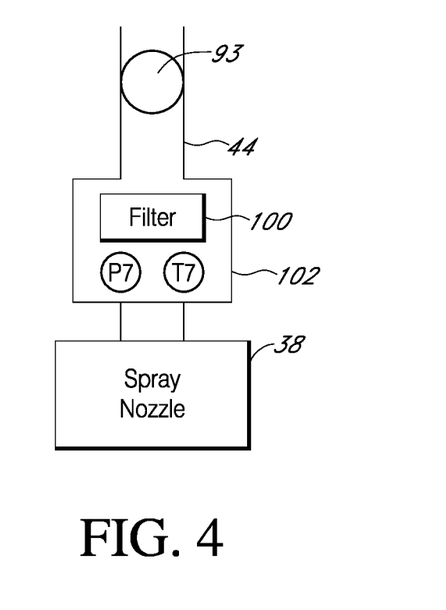
FIG. 4 is a partial schematic view of an environment for rig monitoring system.
Figure 5:
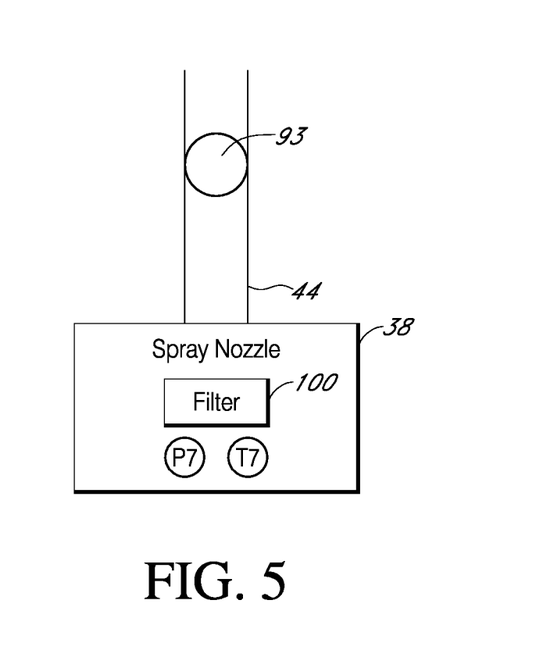
FIG. 5 is a partial schematic view of an environment for rig monitoring system.
Figure 6:
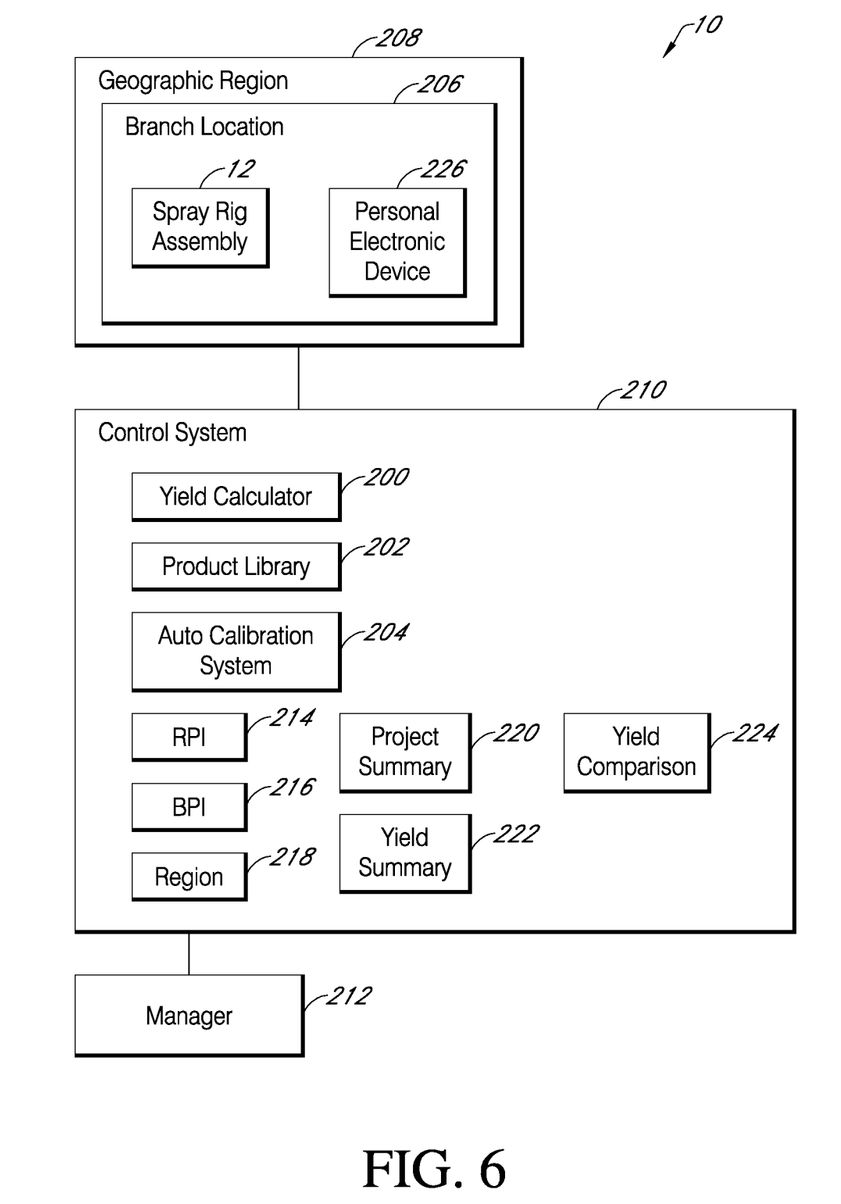
FIG. 6 is a schematic view of an environment for a rig monitoring system.
Figure 7:
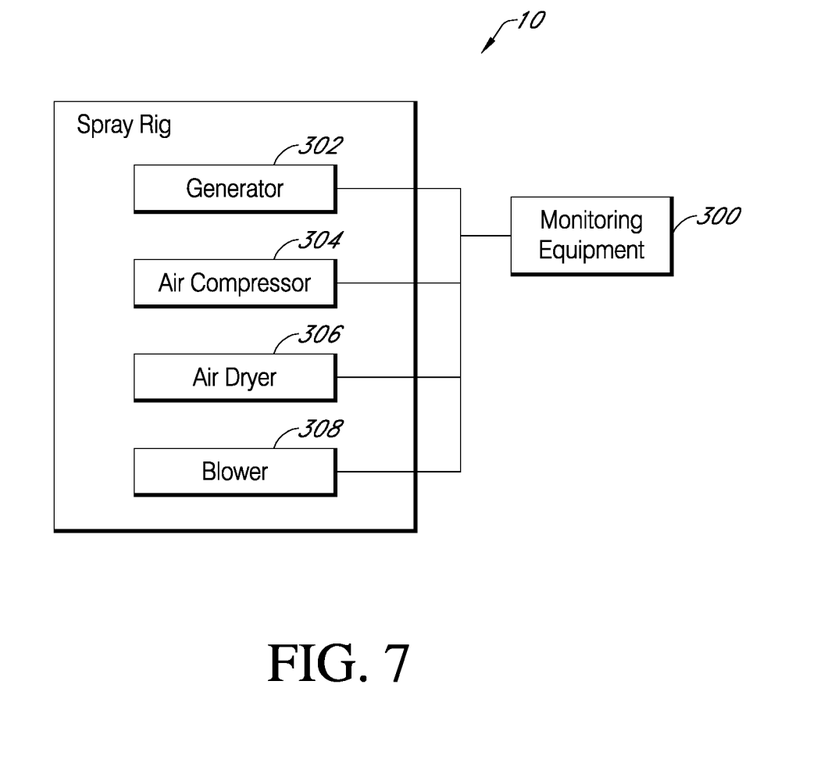
FIG. 7 is a schematic view of an environment for a rig monitoring system.
Figure 8:
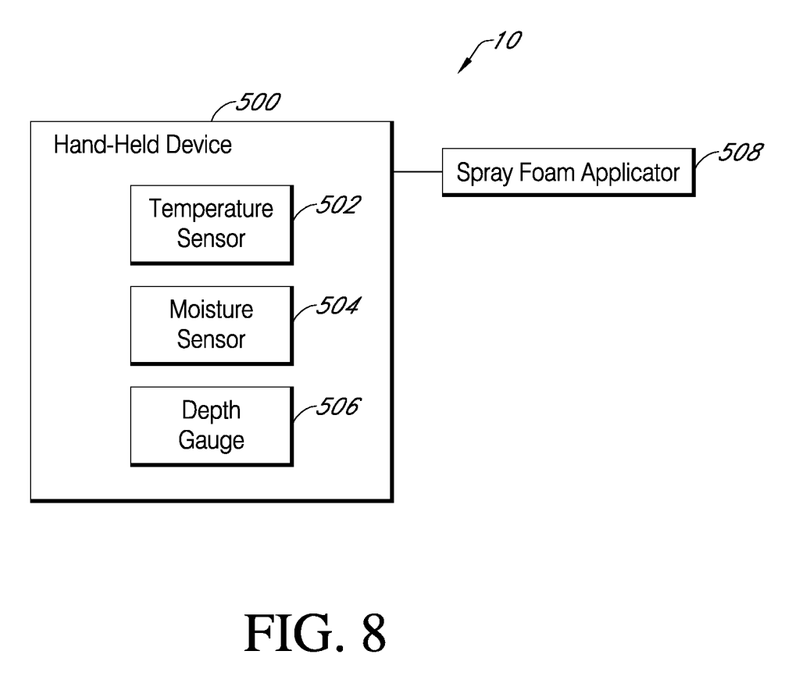
FIG. 8 is a schematic view of an environment for a rig monitoring system.
Figure 9:
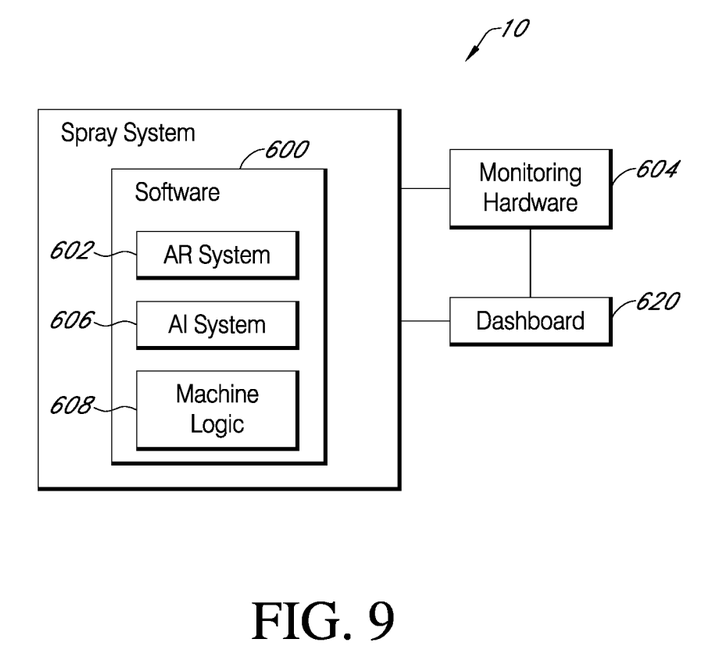
FIG. 9 is a schematic view of an environment for a rig monitoring system.

Referring to the Figures a spray rig monitoring system 10 is used in relation to a spray rig assembly 12. The spray rig assembly 12 is of any configuration and in one example the spray rig assembly 12 has a first tank 14 and a second tank 16 that store a first spray component 18 and a second spray component 19 respectively. Alternatively any number of tanks and/or spray components are used. Customarily, in typical spray rigs raw liquid components would be held in 55 gallon drums but may also be held in fixed bulk tanks, 250 gallon totes, 5 gallon pails, or other.

Connected to and extending from an outlet (such as a pump with a dip tube that is inserted into the drum 20) on the first tank 14 to a first inlet 22 on a plural component proportioner 24 is a first conduit 26. Extending from and connected to an outlet 28 on the second tank 16 and a second inlet 30 on the plural component proportioner 24 is a second conduit 32. The proportioner 24, as is known in the art, pumps, proportions, pressurizes and heats the spray components 18 and 19.

A third conduit 34 is connected to and extends from a first outlet 36 on the proportioner 24 to a spray nozzle or spray gun 38. A fourth conduit 40 is connected to and extends from a second outlet 42 on the proportioner 24 to the spray nozzle 38. Adjacent the spray nozzle 38, both conduits 34 and 40 narrow to form a section known as a whip 44 which permits easier maneuverability of the spray nozzle 38.

Connected throughout the spray rig assembly 12 are a plurality of sensors. The sensors are of any type and are connected at any place on the rig assembly 12 to sense an operational parameters of the assembly. In one example, pressure sensors P1, P2, P3, and P4 are connected to the first outlet 36, the second outlet 42, the first inlet 22, and the second inlet 30 of the proportioner 24 respectively. Additional pressure sensors P5 and P6 are connected to the third conduit 34 and the fourth conduit 40 respectively at the whip section 44.

Temperature sensors T1 and T2 are connected to the first inlet 22 and the second inlet 30 of the proportioner 24 respectively. Temperature sensors T3 and T4 are connected to conduits 34 and 40 respectively at the whip section 44. Temperature sensors T6 and T7 are connected to the third conduit 34 and fourth conduit 40 respectively. Also connected to the rig assembly 12 is an ambient temperature sensor T5 and an ambient relative humidity sensor H1. Connected to the proportioner is a stroke counter sensor S2 that also detects whether the pump is spraying or stationary. Connected to each tank 14 and 16 are load sensors L1 and L2 that determine the weight of each tank 14 and 16.

The rig assembly 12 also has a GPS system 46, security sensors 48 on all walk-thru and rear doors, motion activated hi-res cameras 52 with audio on the interior of the rig assembly 12 and on the exterior of the rig assembly 12. All sensors, the GPS system 46, security sensor 48, load sensors L1 and L2 and motion activated cameras 52 are all connected, preferably wirelessly, to a central computer 54 mounted to the rig assembly 12. The central computer 54 has software 57 and memory 58. The memory 58 permits data to be logged locally for secure data backup and improved accuracy. The central computer 54 also transmits data via a cellular data antenna 60, a Wi-Fi connection 62, or the like to a cloud based storage 64.

A home computer 66, having a processor 68, software 69, memory 70, display 72, and input device 74, is able to access the data in the cloud based storage 64 through a cloud hosted website 76. The website 76 has a dashboard 78 having selection icons for equipment monitoring 80, asset tracking and travel efficiency 82, rig security 84, project management module 86, sales estimating module 88, a crew performance and goal board module 90, safety module 92, and equipment maintenance 94.

The equipment monitoring module icon 80 permits selection of data related to one of multiple spray rig assemblies 12. The data, which is logged multiple times per second for precise accuracy displays an instant visual representation of all data, preferably with real time graphing. The data displayed includes all operational parameters such as pressure and temperature at different locations, proportioner status, and ambient temperature and humidity. Also displayed is the number of strokes and the ratio of the spray component disbursement. The ratio of the spray component disbursement is determined by either the processor 56 of the central computer 54 or the processor 68 of the home computer 66 by calculating the weight loss of each tank 14 and 16 per stroke as detected by load sensors L1 and L2. In addition, the ratio of the spray component can be calculated by either processor 56 and/or 68 based upon a comparison of the pressure and/or temperature in the conduits and particularly in the whip section 44 (or at proportioner outlets 36 & 42). In addition, the ratio of spray component can be calculated by either processor 56 and/or 68 based upon a comparison of the flow as determined by flow meters 93 positioned in first and second material delivery conduits/lines at any location in the conduits and particularly in the whip section. The flow meters 93 exist to monitor operational parameters of the equipment as defined by the user, specifically to ensure correct volumetric proportioning of each chemical. It is important to note that the ratio can be set by the user just like any other equipment parameter with +/−tolerance thresholds. Also important to note that A & B chemical ratio can be set independently so not always required to be 1:1. In some cases, chemical products need to be proportioned at variable ratios like 1.5:1.0.

Using the input device 74, an individual sets high and low thresholds for all pressure, flow, and temperature sensors. When a high or low threshold or limit is exceeded, processor 56 and/or processor 68, by comparing sensed operational parameters with input thresholds, automatically sends an alarm or notification to the rig, an operator and/or the sprayer(s). The alarm/notification is of any type such as sound, light, message or the like and is transmitted in any manner such as by e-mail, text, phone, pop-up, or the like. Similarly, a warning is sent to an operator when a sensed operating parameter falls within a predetermined and pre-input safety margin of the preset threshold. Once a warning or alarm is sent an operator can adjust the operation of the spray rig assembly 12 or shut the assembly off and determine if and/or where the mixed spray component was sprayed off spec.

The asset tracking and travel efficiency selection module icon 82 permits selection of and display of data related to the location and transport of one of multiple rigs 12. Based upon sensed GPS data from the GPS system 46, processor 56 and/or 68 determines and may display the route the rig assembly 12 took to and from the job site, stops made along the route and the duration of the stop, provides alerts for departure and arrival at the shop and/or job site, and the maximum time and distance the rig assembly 12 is from the shop. An operator, using the input device 74, may input the shop location, the job site location, desired departure and arrival times at the shop and job site, and the maximum speed limit for the rig assembly 12. From the sensed data compared to the input information, processor 56 and/or 68 generates and displays reports that show how crews comply with input travel standards, travel efficiency, and analyze travel risks and losses to improve coaching and management.

The rig security icon 84 permits an operator to monitor the security of multiple rigs. Using the input device 74 an operator places a rig in a locked down or secure mode. If, during the secure mode, activity is sensed by door sensors 48 or motion activated cameras 52, in addition to recording the sensed activity, processor 56 and/or 68 sends an alarm to the operator notifying the operator of unintended activity. The alarm can also be sent to local law enforcement. When not in secure mode, door sensors 48 and motion activated cameras 52 still record activity which is stored.

The project management module icon 86 permits an operator to manage and analyze projects. Using the input device 74, an operator inputs project information that includes, but is not limited to the project's date(s), the assigned crew and rig, and the product needed for the project and other relevant data/job parameters/requirements. Processor 56 and/or 68 receive data from sensed and input data and generates and displays reports that permit an operator to manage production. As an example, the different projects and their scheduled dates are displayed on a project calendar. Also a report showing crew and rig allocation and capacity is available for display. Also a report is available for display that permits product and lot identification and tracking. Processor 56 and/or 68 also monitors variance between sensed project results and input project expectations and when preset thresholds are exceed, including, but not limited to, low production capacity and low inventory, actual labor exceeds estimated, actual material usage exceeds estimated, alerts are sent to the operator. Also, an operator is able to display and export reports on job progress, job completion, and job variance as well as incident reports.

The sales estimating module icon 88 permit an operator, using the input device 74, input customer information and proposed project information. Based upon the proposed project information, the processor 56 and/or 68 calculates a project estimate that is displayed and/or exported as part a project proposal. The processor 56 and/or 68 also, based on the input information, automatically manages customer relationship communications based upon preset parameters and generates and displays information related to sales forecasting and sales activity tracking.

An equipment maintenance module icon 94 permits an operator to monitor equipment and inventory based on input parameters, processor 56 and/or 68 tracks scheduled maintenance for equipment such as proportioners sensors, air compressors, fresh air systems, and the like and send alerts to the operator when maintenance is needed. Also, based upon sensed and input information, processor 56 and/or 68 track consumables and generates and displays reports of stock items needed.

The crew performance and goal board module icon 90 permits an operator, using the input device 74, to set goals for the crew for travel efficiency, material usage, maintenance, project duration, and the like. Processor 56 and/or 68 based on sensed data, compares the sensed data to the input goals and then generates and displays a report that shows whether goals have been achieved.

The safety module icon 92 permits an operator to monitor whether proper safety procedures are being followed by crew members. In particular, a pressure sensor P7 is placed on a fresh air hood 98 of each crew member. Processor 56 and/or 68 monitor the pressure in the hood 98 and compare with the stroke counter 51. If the pressure and stroke counter do not match then the crew member is likely spraying without wearing the fresh air hood 98 which is a safety violation. The processor 56 and/or 68 generates and displays a report, as well as provides an alert when a safety violation occurs.

In another embodiment, the system 10 has a filter 100 that is disposed within the spray nozzle or gun 38. The filter 100 filters out solid parts that restrict flow. Alternatively, the filter 100 is disposed within a connecting block 102. The connecting block 102 is positioned between and connected to the whip 44 and the spray gun 38. Downstream from the filter 100, either within the block 102 or the spray gun 38, is at least one pressure and temperature sensor P7 and T7

Also, connected to the central computer 54 is an air quality monitoring system 104. The air quality monitoring system 104 is adapted to monitor contaminants and toxins in the air both during and after a project is completed In yet another embodiment, the spray rig monitoring system 10, in addition to including all elements previous disclosed includes a yield calculator 200, a product library 202, and an auto calibration rig monitoring system 204. While the spray rig monitoring system is used with a single spray rig assembly 12, it is also used in relation to a fleet of spray rig assemblies separated by a plurality of branch locations 206 which reside within a plurality of geographic regions 208. Utilizing one or more computers 210 connected to the monitoring system 10, a number of reports are provided for display or download to a manager 212 in real time. The reports are critical to the operation of the spray rig fleet as they provide immediate awareness of field performance of remote assets in order to take instantaneous and dynamic corrective action. Presently, a manager is not able to do this and must wait days if not weeks in order to evaluate performance of a rig assembly and take corrective actions. As a result, not only are some projects completed at less than optimum conditions, but materials may be wasted, and some projects may need to be redone which is both expensive and time consuming.

One report is a rig performance index report 214 (RPI). To produce the RPI report 214 a number of data points are collected by the monitoring system 10 in real time. The data points include but are not limited to shop departure time, shop return time, pump strokes per day, sets sprayed per day, gallons sprayed per day, incidents resolved per day, travel efficiency to and from the job site, job site efficiency, and the like. Each data point is weighted or prioritized based upon metrics that are considered to be more important versus those that are less important. The report is also designated for a specific time period designated by the user.

A second report is a branch performance index report (BPI) 216 aggregates all RPI reports 214 within a particular branch location. A third report is a region performance index report 218 which aggregates all BPI reports within a region designated by a user.

A fourth report is a project summary report 220. The project summary report includes all relevant quality control data collected by the rig monitoring system 10 for a particular project for a specific date range and specific rig or rigs. The relevant quality control data includes but is not limited to an amount of material installed, amount of hours worked, number of alerts, malfunctions, or incidents that occurred during production and corrective action taken to ensure adequate quality control over the finished product, and the like.

A fifth report is a yield summary report 222 which includes an aggregate of several yields (i.e., yield data points) collected by the rig monitoring system with application input in the field to determine if the foam or coating being applied is achieving the manufacturer's stated yield. A sixth report includes a yield comparison summary report 224 which allows a user to compare and contrast different component spray foams or coating products based upon various filters and conditions from data collected by the rig monitoring system during application. The filters and conditions include, but are not limited to ambient conditions including RHS, ambient air temp and the like; substrate type, temperature, and moisture level; spray temperatures, pressures and the like; and yield performances.

The yield calculator 200, is used by an applicator in the field. Presently, yield calculation are performed manually which are time consuming and susceptible to errors and mistakes. The calculator 200 is downloaded to a personal electronic device 226 such as a phone, tablet, or the like. The calculator 200 is put in yield mode and the field applicator scans a QR code or similar identification code associated with a manufacture's label associated with the product being sprayed. The field applicator also scans a QR code associated with the spray rig monitoring system 12 to obtain a starting stroke count for the yield check. The product, using the spray rig assembly, is then sprayed over a designated area. The designated area, in square feet, is input into the monitoring system 10 as well as the spray depth as an average, or based upon several sample depths where the calculator 200 determines an average depth. Once completed, the field applicator selects "end yield check" to complete the calculation for the project.

The product library 202 is stored in the spray rig monitoring system and includes a plurality of component spray foam or coating products, and the manufacturer's recommended high/low limits for application, temps, pressures, and other spray conditions. Also stored is the product name, estimated yield, and similar product data provided by the manufacturer on the product SDS or technical data sheet. The product library is used in association with auto calibration rig monitoring system 204. The auto calibration system allows for the rig monitoring system to automatically calibrate high/low alert thresholds for the specific product being used through selection of the specific product in the product library 202, or through scanning the QR code on the manufacturer's product label. The inclusion of the product library 202 stored within the spray rig monitoring system 12 along with use of the auto calibration system 204 eliminates a technical problem of setting the rig monitoring system at correct temperature and pressure thresholds. Currently, field operators either do not set thresholds or they are set at safe ranges where thresholds will not be reached. Now, an alarm or warning will automatically be activated should the system exceed the thresholds for the specific product.

To assist in dynamic and instantaneous correction of the spray rig assembly, the system includes communication features such as video chat, facetime and the like to assist the field applicator in enabling or disabling the system. The system is also equipped with both video and audio features. The video and audio features along with the system provide proof of corrective action through time stamped information related to alerts and corrective action in order to close a feedback loop.

In an additional embodiment, the spray rig monitoring system 10 includes all elements previously disclosed along with monitoring hardware 300 such as sensors or the like that monitor the operating parameters of a generator 302, an air compressor 304, an air dryer 306, and an insulation blower 308. The monitoring hardware 300 detects and transmits the operating parameters to one or more computers 310 for analysis and reporting.

The parameters monitored with the generator 302 include but are not limited to voltage, amps, oil pressure, coolant temperature, hours of operation and the like. The parameters monitored with the air compressor 304 include but are not limited to discharge temperature, discharge air pressure, the percentage of moisture in the discharge air, the hours of operation, and the like. The parameters monitored in the air dryer 306 include but are not limited to inlet air temperature, the percentage of moisture in the inlet air, the outlet air temperature, the percentage of moisture in the outlet air, the hours of operation and the like. The parameters monitored with the loose-blown fibrous insulation blower 308 include but are not limited to the weight of material in the staging area or feed hopper, the throughput of material as seen with an optical sensor, the hours of operation and the like.

In another embodiment, the spray rig monitoring equipment 10 includes all elements previously disclosed along with hardware monitoring equipment 400 used in a real-world environment that is affixed to a piece of equipment 410 or to an individual 420 and is related to a spray rig. The monitoring equipment 400 measures specific real-world metrics and gathers data from the equipment 410 and/or the individual 420 as previously disclosed and transmits the metrics to a cloud based server 430. The cloud based server 430 then uses the transmitted metrics to create a digital game environment 440. The digital game environment 440 is in any form and includes, but is not limited to, a virtual game board, leader board, or other virtual reality, augmented reality, or other simulated game environment where the individual operator/user/player's actual performance in the real-world is measured and "gamified" using traditional game-theory, gaming metrics and other standard gaming elements to create a competitive user experience across some if not all of the game platforms. The operator/user/player's real-world performance, as measured by the monitoring equipment 410, is translated into a digital performance inside a digital game environment 440 that is created by software 450 in the cloud based server 430.

The game mechanics may include some or all of the following including a scoring/reward system 460 that includes collection of tokens, points, scores, jewels, or other digital currency used by the game; rewards 470 such as compensation, unlocks, benefits, perks, and other advantages bestowed on the operator/user/player for meeting achievements within the digital platform; and leaderboards 480 directed to a company and/or social media to enrich the experience into a multi-player experience. Also, the game mechanics would include recognition and awards 485 to game winners for raw material suppliers, manufacturers, equipment manufacturers, contractors, and other affiliated sources or sponsors; along with credentials, status, awards, merits and other status indicators that may be accumulated and catalogued into a user dossier, player profile, and the like. The users are permitted to interact with one-another inside a web-based platform, smartphone application, website, webpage, social media platform or any type of interactive platform 490.

In yet another embodiment a hand-held device 500 having an infrared or other temperature sensor 502, a moisture sensor 504, and a mechanical or digital depth gauge 506 is used in relation with a spray foam applicator 508 during an installation process. The hand-held device is used to ascertain the temperature and moisture content of the substrate or application surface and the depth of the applied foam. In addition, the hand-held device 500 captures measurements digitally that are stored and then transmits measurement data to a spray rig monitoring system 10. The transmitted measurement data is then logged and displayed using the spray rig monitoring system 10.

Finally, in another embodiment, the spray system 10 includes software 600 that utilizes one or more of a virtual or augmented reality data system 602, data gathered from on-site monitoring hardware 604 such as sensors, artificial intelligence 606, developer or machine developed logic engines 608 and other algorithms and the like. The software 600 creates models to predict the future-state of finished product quality, project profitability, sales, and overall performance of machinery, equipment lifespan, crew turn-over, crew performance, raw material yields and performance, and other factors relevant and essential to the manufacturing and application of plural component products like spray polyurethane foam, polyurea coatings, and other plural component, site-manufactured products.

The system 10 also includes a dashboard 620 that permits a user to recorded corrective action, including photos and video to correct quality problems with finished spf products that arise as a result of violating an alert threshold within the system 10. A report of corrections can be produced based on projects and/or products.

From the above discussion and accompanying figures and claims it will be appreciated that the system 10 offers many advantages over the prior art. It will be appreciated further by those skilled in the art that other various modifications could be made to the device without parting from the spirit and scope of this invention. All such modifications and changes fall within the scope of the claims and are intended to be covered thereby. It should be understood that the examples and embodiments described herein are for illustrative purposes only and that various modifications or changes in the light thereof will be suggested to persons skilled in the art and are to be included in the spirit and purview of this application.

What is claimed is:

1. A spray rig monitoring system, comprising:
   a rig assembly having a source of spray components connected to a plural component proportioner;
   a spray gun connected to the plural component proportioner; and
   a control system having an associated yield calculator, a product library, and an auto calibration rig monitoring system, wherein the auto calibration system automatically calibrates high/low alert thresholds for temperature and pressure for a specific product being used through the selection of the specific product in the product library and the auto calibration rig monitoring system provides an alert when system thresholds for temperature and pressure are exceeded for a specific product.

2. The system of claim 1 wherein the product library contains manufacturer recommendations for operating parameters for specific products.

3. The system of claim 1 wherein the control system provides a rig performance index report.

4. The system of claim 1 wherein the control system provides a branch performance index report.

5. The system of claim 1 wherein the control system provides a region performance index report.

6. The system of claim 1 wherein the control system provides a project summary report.

7. The system of claim 1 wherein the control system provides a yield summary report.

8. The system of claim 1 wherein the control system provides a yield comparison summary report.

9. The system of claim 1 further comprising monitoring hardware connected to a generator.

10. The system of claim 1 further comprising monitoring hardware connected to an air compressor.

11. The system of claim 1 further comprising monitoring hardware connected to an air dryer.

12. The system of claim 1 further comprising monitoring hardware connected to an insulation blower.

13. The system of claim 1 further comprising a software system to predict a future state.

14. The system of claim 1 wherein the product library contains a manufacturer's recommended high/low limits for temperatures and pressures for specific products.

15. The system of claim 1 wherein the product library contains a product name and estimated yield.

* * * * *